(12) United States Patent
Fukaya

(10) Patent No.: US 8,537,397 B2
(45) Date of Patent: Sep. 17, 2013

(54) IMAGE PROCESSING APPARATUS AND CHECK CONTROL METHOD FOR CONTROLLING AN OUTPUT IMAGE CHECK FUNCTION

(75) Inventor: Hideaki Fukaya, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 340 days.

(21) Appl. No.: 13/040,499

(22) Filed: Mar. 4, 2011

(65) Prior Publication Data

US 2011/0216362 A1     Sep. 8, 2011

Related U.S. Application Data

(60) Provisional application No. 61/310,986, filed on Mar. 5, 2010.

(51) Int. Cl.
| | | |
|---|---|---|
| *G06F 15/00* | (2006.01) | |
| *G06F 3/12* | (2006.01) | |
| *G06K 1/00* | (2006.01) | |
| *G06K 15/00* | (2006.01) | |
| *H04N 1/40* | (2006.01) | |

(52) U.S. Cl.
USPC ......................................... 358/1.15; 358/3.28

(58) Field of Classification Search
None
See application file for complete search history.

(56) References Cited

U.S. PATENT DOCUMENTS

2008/0198394 A1* 8/2008 Hamada et al. ............... 358/1.9
2009/0128858 A1* 5/2009 Kiuchi et al. ................ 358/3.28

FOREIGN PATENT DOCUMENTS

JP      2009-005356      1/2009

* cited by examiner

*Primary Examiner* — Douglas Tran
(74) *Attorney, Agent, or Firm* — Turocy & Watson, LLP

(57) ABSTRACT

According to an embodiment, an image processing apparatus includes an information adding unit, an execution determination unit, and an execution control unit. The information adding unit determines whether or not to store first information to which a predetermined value is added, in a storage unit, based on a result of analysis of image data, and adds the predetermined value to the first information and stores the first information in the storage unit in association with the image data when the determination is positive. The execution determination unit determines whether the first information with the predetermined value added thereto is in the storage unit or not. The execution control unit controls whether or not check of print quality is to be executed before the execution of print of the image data, based on the result of the determination by the execution determination unit.

20 Claims, 12 Drawing Sheets

FIG. 4A

PERMIT EXECUTION OF IMAGE SELF-CHECK?
- ○ PERMIT DENSITY CHECK ONLY
- ○ PERMIT COLOR SHIFT CHECK ONLY
- ◉ PERMIT BOTH DENSITY CHECK AND COLOR SHIFT CHECK
- ○ NOT PERMIT (COLOR SHIFT OR THE LIKE MAY OCCUR IN PRINTED MATTER)

[ OK ]   [ CANCEL PRINT ]
  B1          B2

PRINTER NAME: Printer1 ▽   [ PROPERTY ]
STATUS   : BUSY        ☐ MONOCHROME PRINT
LOCATION : 192.168.X.X

NUMBER OF PRINT COPIES: [    ]
☑ PRINT BY NUMBER OF COPIES

---

PRINT RANGE:
- ◉ ALL
- ○ DESIGNATED PAGE(S): From [  ] to [  ]

☑ PERMIT IMAGE SELF-CHECK

[ OK ]   [ CANCEL PRINT ]

W2
C1

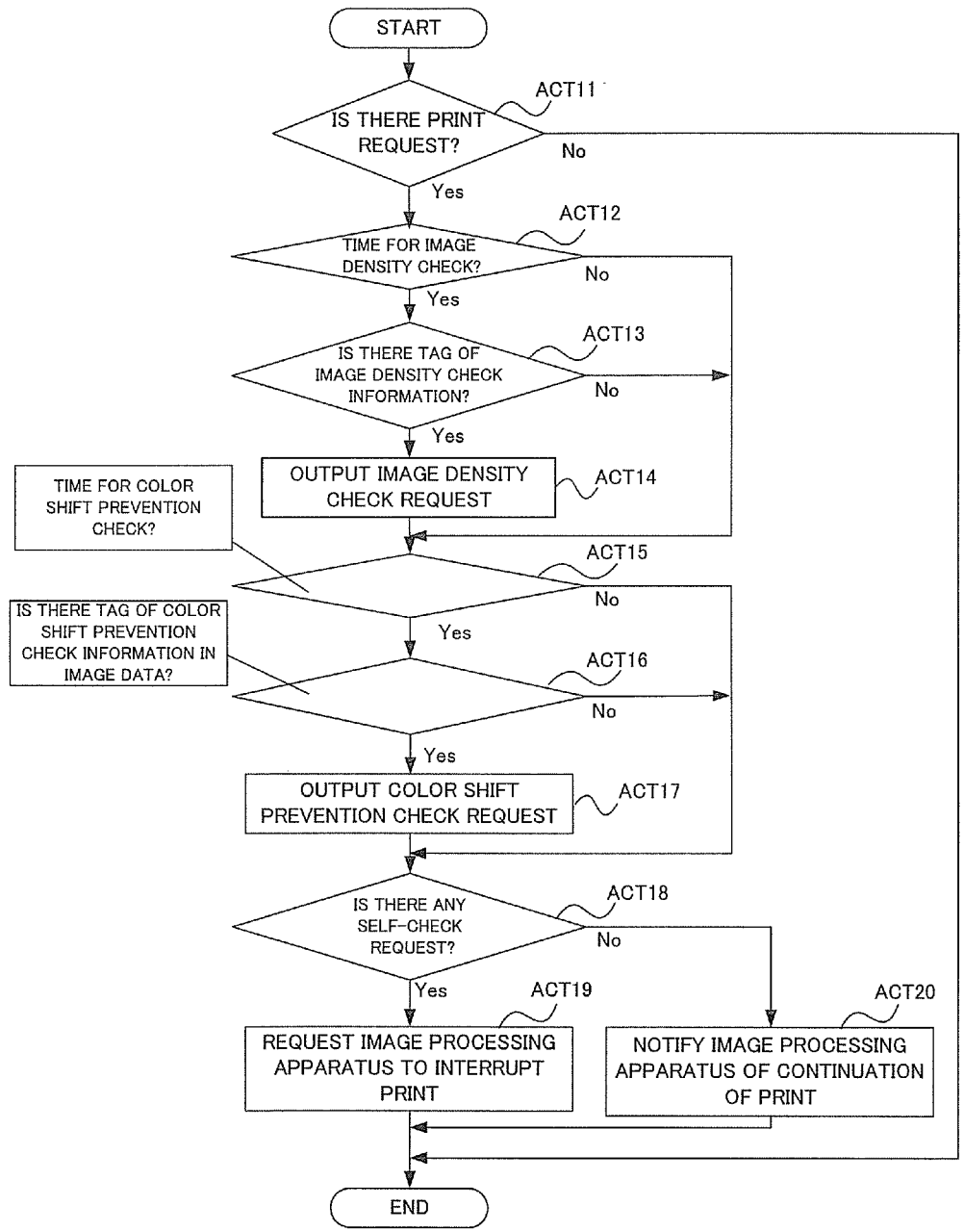

IMAGE PROCESSING APPARATUS AND CHECK CONTROL METHOD FOR CONTROLLING AN OUTPUT IMAGE CHECK FUNCTION

CROSS-REFERENCE TO RELATED APPLICATION

This application is based upon and claims the benefit of priority from: U.S. provisional application 61/310,986, filed on May 5, 2010; the entire contents all of which are incorporated herein by reference.

FIELD

Embodiments described herein relate generally to a technique of controlling an output image check function in an image processing apparatus.

BACKGROUND

Conventionally, an image processing apparatus suitably executes check of print quality (hereinafter referred to as self-check) according to needs. When carrying out self-check, the image processing apparatus interrupts the execution of a current printing job and checks image density and shift of a color toner.

However, since the interruption of print delays the output of print, the user must wait accordingly until the print is completed.

DESCRIPTION OF THE DRAWINGS

FIG. 4A shows an example of display to prompt a user to select permission of execution of self-check.

FIG. 4B shows an example of display in the case where a section to prompt the user to select permission of execution of self-check is provided on a print dialog.

FIG. 6 is a flowchart showing an example of operation when the image processing apparatus performs control based on added contents of tag information.

DETAILED DESCRIPTION

According to an embodiment, an image processing apparatus includes an information adding unit, a determination unit, and an execution control unit. The information adding unit determines whether or not to store first information to which a predetermined value is added, in a storage unit, based on a result of analysis of image data, and adds the predetermined value to the first information and stores the first information in the storage unit in association with the image data when the determination is positive. The determination unit determines whether the first information with the predetermined value added thereto is in the storage unit or not, after a request for execution of print of the image data is acquired. The execution control unit controls whether or not check of print quality is to be executed before the execution of print of the image data, based on the result of the determination by the determination unit.

Before explaining details of the present embodiments, its outline will be described. In the embodiments, information (hereinafter referred to as tag information) of whether self-check is necessary or not, is added to image data. The self-check includes two types of checks, that is, a check to stabilize image density and a check to prevent color shift in a color image. In the embodiments, tag information is provided for each of these two types of checks. The tag information is added on the basis of a determination by the image processing apparatus or is added on the basis of a designation by a user.

Even when it is determined by the image processing apparatus that self-check is necessary during print, if a value for self-check permission is not added to the tag information, the image processing apparatus gives priority to the tag information and does not carry out self-check to this image data. Meanwhile, when a value for self-check permission is added to the tag information, the image processing apparatus executes image self-check.

When the image processing apparatus has a function that enables the apparatus to accumulate plural print jobs and collectively execute the prints in arbitrary timing, the image processing apparatus rearranges the print order of the print jobs based on the tag information.

Hereinafter, each embodiment will be described with reference to the drawings.

First Embodiment

Figure 1:
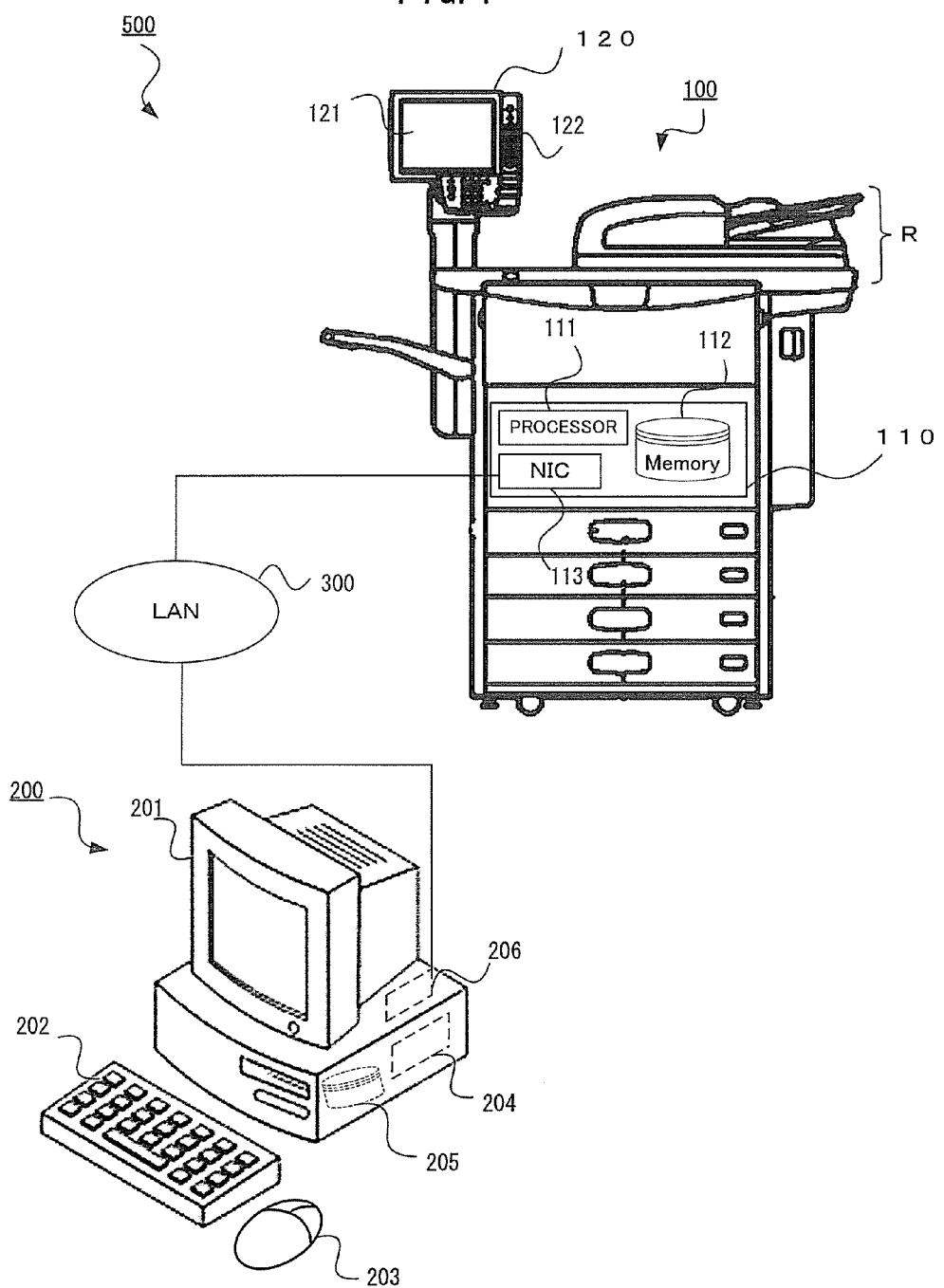
FIG. 1 is a schematic view showing the configuration of a system.

FIG. 1 shows an example of the configuration of a system according to a first embodiment. A system 500 has an image processing apparatus 100 that is an MFP (multifunctional peripheral) including a copy function, a printer function, a scanner function, and a transmission and receiving function for FAX and email, and a PC (personal computer) 200 used by a user. The image processing apparatus 100 and the PC 200 are connected by a LAN (local area network) 300 and can communicate with each other.

Figure 2:
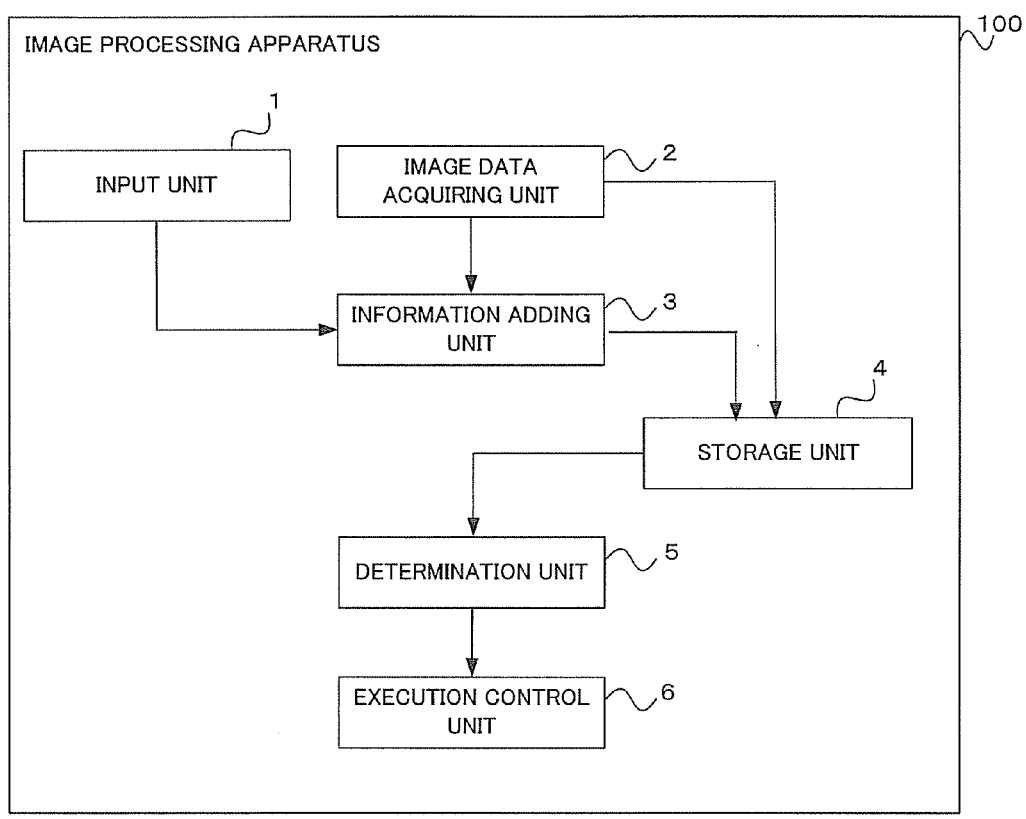
FIG. 2 is a block diagram of an image processing apparatus according to a first embodiment.

The image processing apparatus 100 has a control board 110 which centrally controls hardware devices within the apparatus and realizes each unit described with reference to FIG. 2 and the subsequent diagrams. The control board 110 has a processor 111 that is an operation processing unit, and has a memory 112 including a RAM (random access memory) as a volatile storage device, a ROM (read only memory) as a non-volatile storage device and an HDD (hard disk drive). The control board 110 also has a NIC (network interface card) 113 which controls communication with outside.

The image processing apparatus 100 has a control panel 120 including a keyboard 122 which accepts an instruction from the user and a touch panel display 121 which displays control contents and accepts an instruction from the user.

The image processing apparatus 100 also has an image reading unit R which scans and reads images of a sheet document and a book document.

The hardware configuration of the PC 200 is similar to any existing PC and includes a processor 204, a memory 205, a NIC 206, a keyboard 202 which accepts an input from the user, a mouse 203, and a monitor 201 which displays an image to the user. The NIC 113 and the NIC 206 control communication with each other via the LAN 300.

Next, functional blocks of the image processing apparatus 100 will be described with reference to FIG. 2. The image processing apparatus 100 has an input unit 1, an image data acquiring unit 2, an information adding unit 3, a storage unit 4, a determination unit 5, and an execution control unit 6. Each unit within the image processing apparatus 100 shown in FIG. 2 is realized by a configuration including the processor 111 and the memory 112 (here referred to as a configuration A) and is realized as a program stored in advance in the memory 112 is operated and executed by the processor 111. The input unit 1 is realized by a configuration including the control panel 120 (when the user operates on the image processing apparatus 100) and the NIC 113 (when the user uses the PC 200) in addition to the configuration A. The image data acquiring unit 2 is realized by a configuration including the image reading unit R (when acquiring image data by scanning a document) and the NIC 113 (when acquiring image data from the PC 200) in addition to the configuration A.

Figure 3:
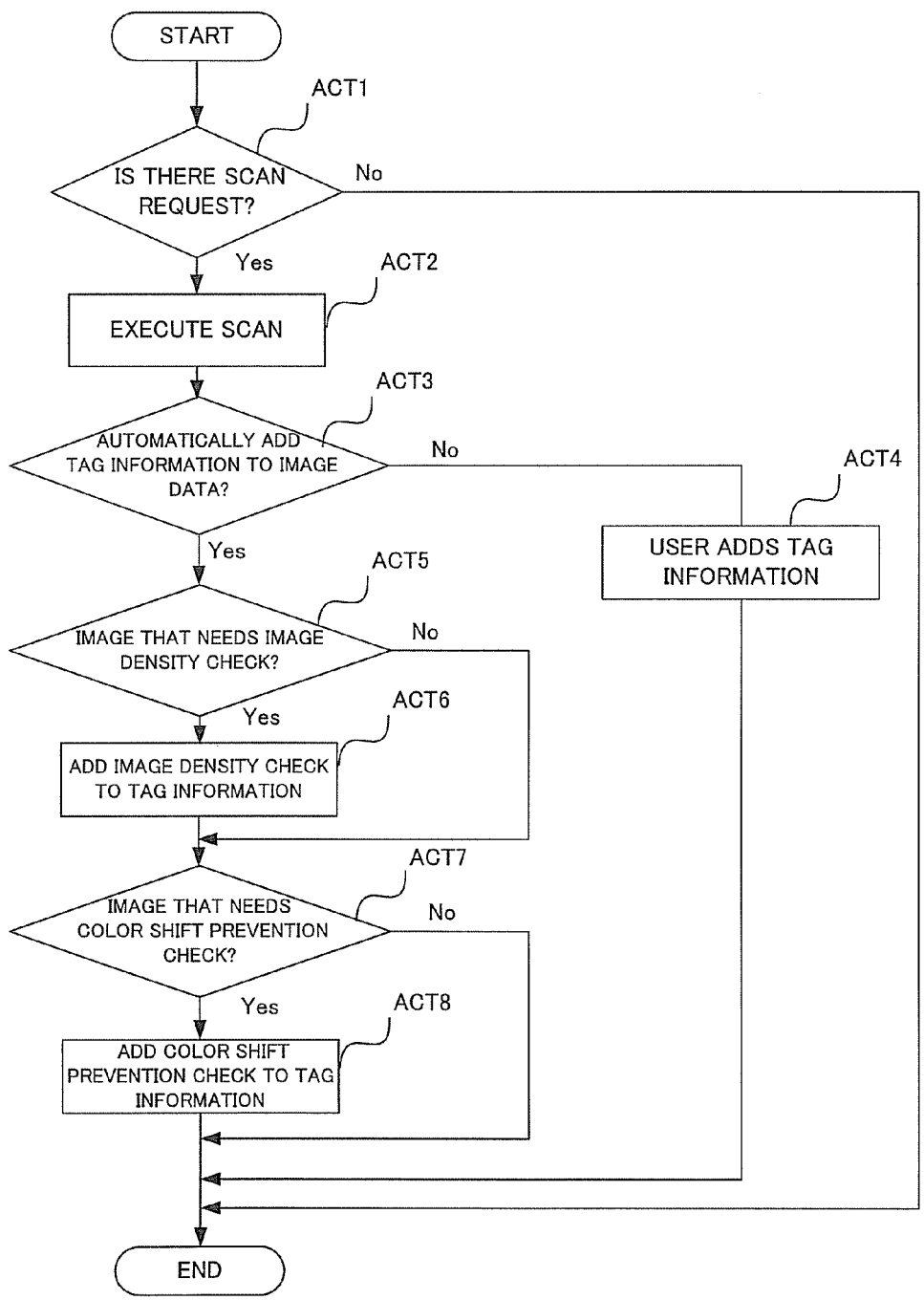
FIG. 3 is a flowchart showing an example of operation when the image processing apparatus creates tag information.

FIG. 3 is a flowchart showing an example of operation up to the addition of tag information by the image processing apparatus 100. The image data acquiring unit 2 determines whether there is a print instruction from the PC 200 or a request for scanning using the image reading unit R (ACT 1). When there is such a request (ACT 1, Yes), the image data acquiring unit 2 acquires image data via the NIC 113 or the image reading unit R (ACT 2). The image data acquiring unit 2 stores the acquired image data, and various setting values including the number of sheets and the number of print copies for this image data, distinction between monochrome and color prints, sheet size, and magnification, collectively as a print job in the storage unit 4.

After the acquired image data is analyzed through image processing, the information adding unit 3 determines whether the current mode is a mode in which the image processing apparatus 100 determines and adds tag information (automatic addition mode) or not (ACT 3). Here, when the current mode is not the automatic addition mode (ACT 3, No), a message is transmitted to the PC 200 at the source of the acquired image data. The PC 200 displays a message about whether to add tag information or not, on the monitor 201, and notifies the user of the message (ACT 4). When image data is acquired by scanning a document, the control panel 120 displays this message. FIG. 4A shows an example of the message displayed on the monitor 201. The PC 200 displays a message screen W1 and prompts the user to select whether to permit self-check or not. When self-check is permitted, the user is prompted to select whether to permit execution of one of density check and color shift check or both. After the selection by the user, when a button B1 in the message screen W1 is pressed, the input unit 1 acquires the information selected by the user (hereinafter referred to as selected information) and outputs this information to the information adding unit 3. The information adding unit 3 creates tag information based on the selected information from the input unit 1. That is, when the selected information has a value to permit self-check, the information adding unit 3 adds a predetermined value to tag information and stores the resulting tag information in the storage unit 4. When the selected information does not have a value to permit self-check, the information adding unit 3 adds a different value from the predetermined value to tag information and stores the resulting tag information in the storage unit 4. Alternatively, it is conceivable that when the selected information does not have a value to permit self-check, the tag information itself is not created. The similar operation is carried out also when image data is acquired by scanning a document or when an image received via FAX is acquired.

It is also possible to provide a section to decide whether to permit self-check or not, on a print setting dialog, and then prompt the user to select before a print instruction is received from the PC 200 or the control panel 120 (before ACT 1). FIG. 4B shows an example of a print dialog before a print instruction. A self-check permission section C1 is provided on a print dialog W2. When a checkmark is placed in this section, the information adding unit 3 adds a predetermined value to tag information (in this case, tag information for both density check and color shift check). When there is no checkmark, the information adding unit 3 does not add a predetermined value to tag information (in this case, tag information for both).

The description returns to the flowchart of FIG. 3.

When the current mode is the automatic addition mode (ACT 3, Yes), the information adding unit 3 determines whether or not to store the tag information to which a value to permit self-check is added, in the storage unit 4, based on the result of analysis in the image processing. When this determination is positive, the information adding unit 3 adds a value to permit self-check to the tag information and stores the tag information in the storage unit 4 in association with the image data (ACT 5 to ACT 8).

The information adding unit 3 determines whether the image data is an image which needs image density check or not (ACT 5). When the image data is determined as an image which needs image density check (ACT 5, Yes), the information adding unit 3 adds a value to permit image density check (the above predetermined value) to the tag information and stores the tag information in the storage unit 4 in association with the image data or the print job (identification information of the print job) (ACT 6).

When, for example, in ACT 5, a photograph-only mode is selected according to the scanning mode or when it is determined that fine image quality is necessary based on the number of pixels and area ratio in the image processing, the information adding unit 3 adds the value to permit image density check to the tag information.

Figure 5A:
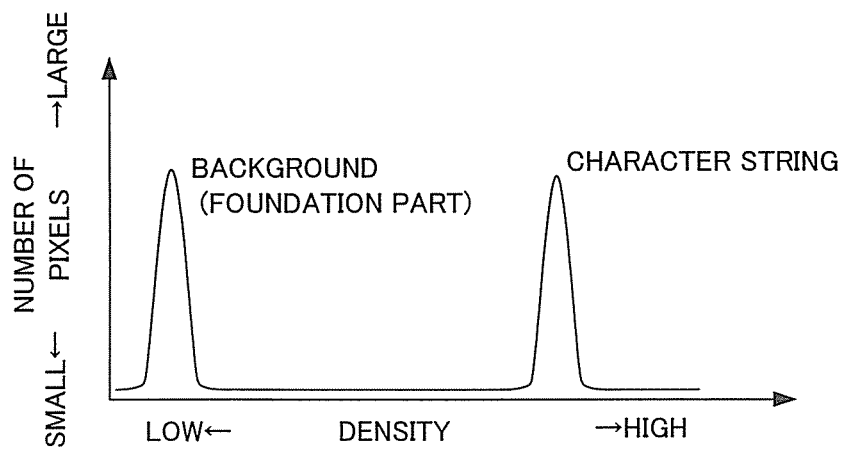
FIG. 5A shows an example of correspondence between density and the number of pixels in a character string image.
Figure 5B:
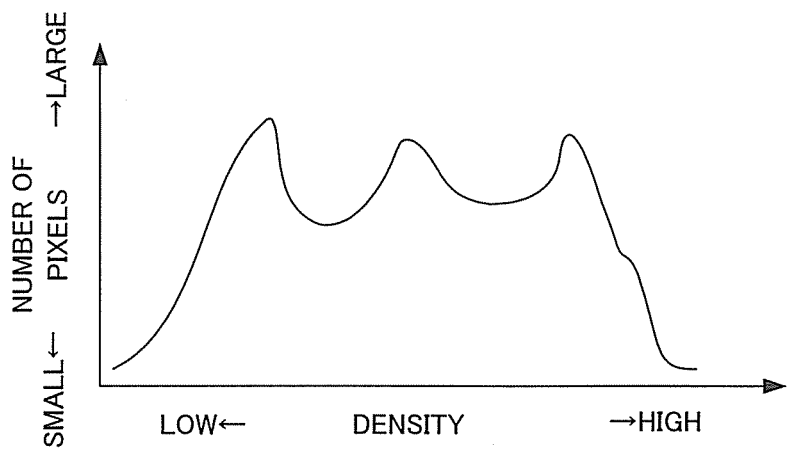
FIG. 5B shows an example of correspondence between density and the number of pixels in a photographic image.

Specifically, the relation between the number of pixels and density is analyzed in the image processing and it is determined whether the image data is formed by a photograph or a character string, for example, as in the histogram determinations shown in FIG. 5A and FIG. 5B. In FIG. 5A, there are two peaks, that is, a background (foundation part) and a character string part. Therefore, the image data is determined as character string data. In FIG. 5B, unlike FIG. 5A, peaks exist not only at two positions. Therefore, the image data is determined as a photograph.

When the image data is determined as a photograph in the image processing, for example, based on halftone determination or edge detection, the information adding unit 3 adds the value to permit image density check to the tag information. Meanwhile, when the image data is determined as being formed by a character string in the image processing, high image quality is not required and therefore the value to permit image density check is not added to the tag information (the processing goes from ACT 5, No to ACT 7).

When the image data is determined as an image which needs check for color shift (ACT 7, Yes), the information adding unit 3 adds a value to permit color shift prevention check to the tag information and stores the tag information in the storage unit 4 in association with the image data or the print job (ACT 8). When the image data is determined as a monochrome image or mono-color image using only a specific color in the image processing, color shift prevention check is not necessary and therefore the information adding unit 3 does not add the value to permit color shift prevention check to the tag information (ACT 7, NO, and thus the processing of FIG. 3 ends). Meanwhile, when the image data is determined as an image using plural colors from among cyan, magenta, yellow, and black in the image processing, the information adding unit 3 adds the value to permit color shift prevention check to the tag information and stores the tag information in the storage unit 4.

In the operation shown in FIG. 3, it is possible not to provide the determination of ACT 3. In this case, ACT 4 is executed after ACT 2, and then ACTs 5 to 8 are executed.

Next, the self-check control operation by the image processing apparatus 100 based on tag information will be described with reference to FIG. 6. FIG. 6 is a flowchart showing the operation in terms of one job. When plural jobs are accumulated, the processing shown in FIG. 6 is sequentially executed for each job.

When preparations for the execution of the job are completed within the image processing apparatus 100 and there is a request for print (ACT 11, Yes), the determination unit 5 acquires job data including image data stored in the storage unit 4. Here, the determination unit 5 determines whether it is time for image density check or not (ACT 12). The determination unit 5 determines whether the time period during which image density check is not carried out exceeds a predetermined period (threshold value) or not (that is, whether there is a lapse of a predetermined period after check is executed or not), and thus determines whether it is time for image density check or not. When the determination unit 5 determines that it is not time for image density check (ACT 12, No), image density check is not necessary and therefore the processing shifts to ACT 15. Meanwhile, when the determination unit 5 determines that it is time for image density check (ACT 12, Yes), the determination unit 5 determines whether or not there is tag information to which the value to permit image density check is added and which corresponds to the image data, in the storage unit 4 (ACT 13). Here, when there is no tag information to permit image density check (ACT 13, No), the determination unit 5 shifts the processing to ACT 15. Meanwhile, when there is tag information with the value to permit image density check (ACT 13, Yes), the determination unit 5 outputs a message to request image density check to the execution control unit 6 (ACT 14).

The determination unit 5 determines whether it is time for color shift prevention check or not, similarly to image density check (ACT 15). When the determination unit 5 determines that it is time for color shift prevention check (ACT 15, Yes) and determines that the value to permit color shift prevention check is added to the tag information of the image data (ACT 16, Yes), the determination unit 5 outputs a message to request color shift prevention check to the execution control unit 6 (ACT 17). When the determination is negative in ACT 15 and ACT 16, the processing shifts to ACT 18.

When a message to request any image self-check for the job or image data is acquired (ACT 18, Yes), the execution control unit 6 outputs a message to request print interruption and thus performs control so that self-check is executed (ACT 19). Meanwhile, when a message to request self-check is not acquired (ACT 18, No), the execution control unit 6 outputs a message to request print continuation and thus performs control so that self-check is not executed (ACT 20). Depending on the self-check mechanism unit, it may suffice to output only one of the message to request print interruption and the message to request print continuation.

By carrying the processing shown in FIG. 3 and FIG. 6 for each image data or each job, it is possible to postpone the implementation of image self-check while maintaining image quality. Thus, convenience to the user is improved.

Second Embodiment

In a second embodiment, the operation of rearranging the print order of image data according to the current status of the image processing apparatus when the image processing apparatus has a function that enables accumulating plural print jobs and collectively executing the prints in arbitrary timing, will be described.

Figure 7:
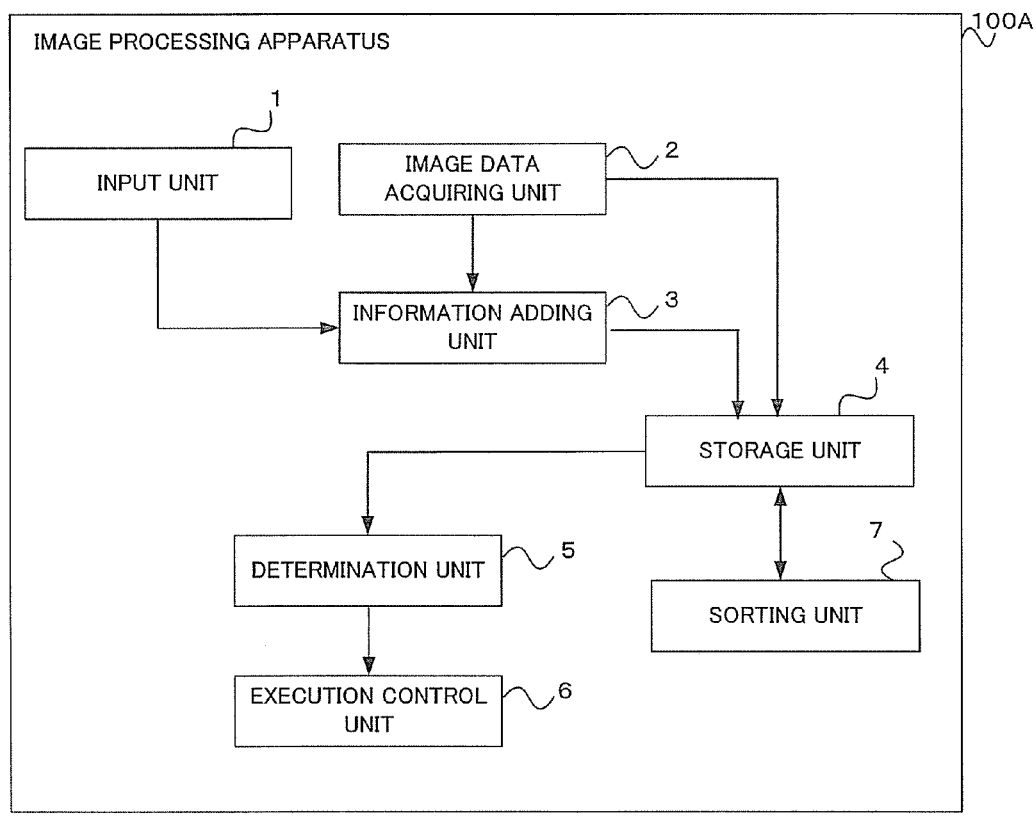
FIG. 7 is a block diagram of an image processing apparatus according to a second embodiment.

FIG. 7 is a block diagram of the image processing apparatus according to the second embodiment. An image processing apparatus 100A further includes a sorting unit 7 in the image processing apparatus 100 according to the first embodiment. The configuration of the apparatus and the other blocks are similar to the first embodiment. The determination unit 5 and the execution control unit 6 in the second embodiment executes their operations to each job in the sorted order after the sorting by the sorting unit 7 is finished (the processing of ACT 11 and the subsequent ACTs are executed after the sorting).

Figure 8:
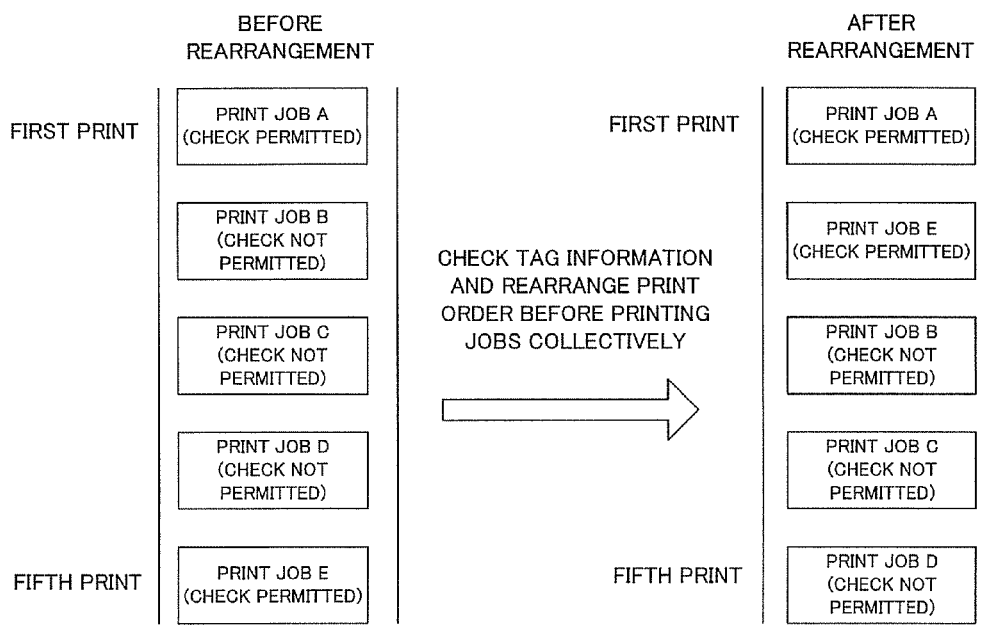
FIG. 8 is a view for explaining an example where a sorting unit according to the second embodiment sorts print jobs.

The operation of the sorting unit 7 will be described with reference to FIG. 8. Before plural print jobs are executed, the sorting unit 7 determines for each job whether there is tag information with the value to permit self-check added thereto or not, and shifts jobs with the value added thereto to higher places in the order. In the example of FIG. 8, the print job E is supposed to be executed fifthly. However, since the print job E has the value to permit self-check added thereto, the sorting unit 7 sorts the print jobs so that the print job E is executed secondly, that is, next to the print job A with the value to permit self-check added thereto.

In the case it is immediately after self-check is carried out, the print order can be rearranged so that image data corresponding to tag information with the value to permit self-check added thereto is preferentially printed, and execution of unnecessary self-check can thus be reduced. When the rearrangement is not carried out, in the example of FIG. 8, image self-check may need to be carried out again at time of executing the print job E. However, if the print order is rearranged, self-check in the print job E is not necessary because this job is after the implementation of self-check due to the lapse of a predetermined time period or after the implementation of self-check due to the print job A. Moreover, image self-check is not necessary for the print job with the third highest print priority and the subsequent print jobs.

In this manner, the sorting unit 7 sorts the print order so that image data corresponding to tag information with the value to permit check added thereto are collectively printed. The sorting unit 7 also sorts the print jobs so that image data corresponding to tag information with the value to permit check added thereto shifts to a higher place in the print order.

When the accumulated print jobs have print instructions given by different users, some users may suffer disadvantage from the change in order. Therefore, it is possible to configure the sorting unit 7 to sort the print jobs when the accumulated print jobs are from the same user, and not to sort the print jobs when the print jobs are from different users. In this case, the sorting unit 7 determines whether the print jobs are from the same user or not, for example, based on the determination of whether the jobs are sent from the same PC or not, or authentication using IC card, user ID and password.

It is also possible to enable permission of sorting even when the print jobs are from plural users. Specifically, it is made possible to execute permission or prohibition of the sorting via the input unit 1 of the image processing apparatus 100A.

Figure 9:
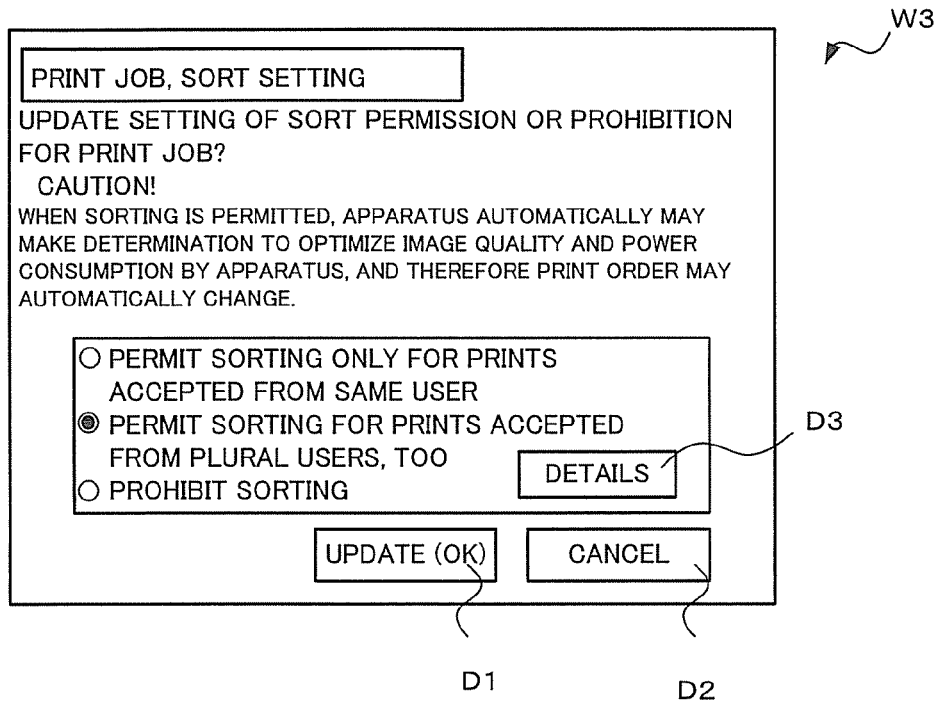
FIG. 9 shows an example of display about sort setting for print job.

FIG. 9 shows an example of a message displayed on the monitor 201. The PC 200 displays a message screen W3 so that prohibition or permission of the rearrangement of plural jobs by the sorting unit 7 can be selected. As the message screen W3 is used, the sorting unit 7 can sort print jobs even when the print jobs are accepted from plural users.

Figure 10:
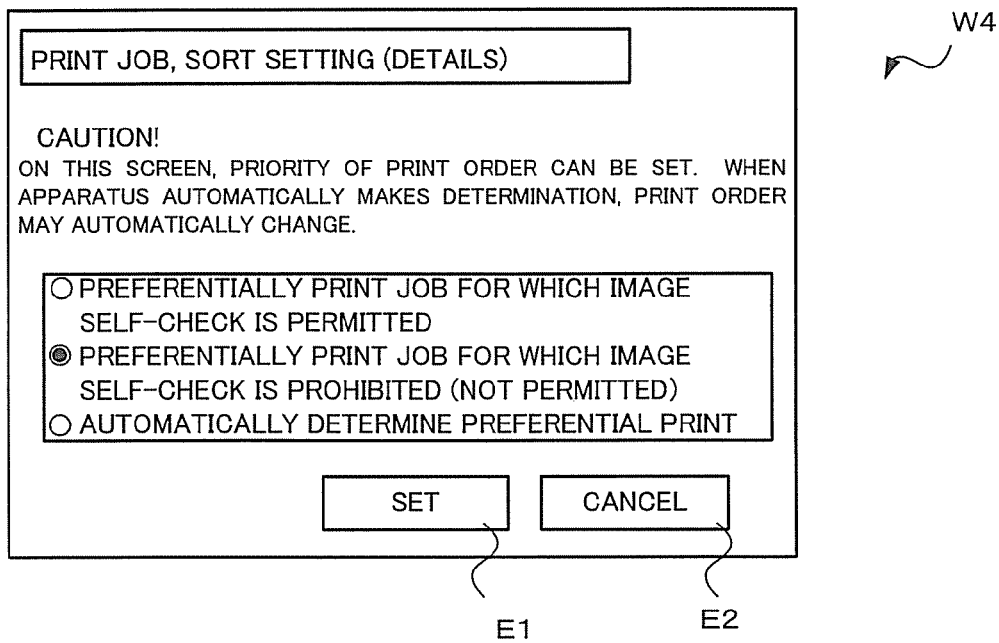
FIG. 10 shows an example of display about detailed sort setting for print job.

When setting to permit a certain kind of sorting is selected in the message screen W3, a button D3 can be pressed. As the button D3 is pressed, the monitor 201 displays a message screen W4 shown in FIG. 10. FIG. 10 shows the setting to rearrange the print order so that print jobs with image self-check prohibited (check not permitted) are preferentially printed. As a button E1 is pressed, detailed setting is completed and the display returns to the message screen W3. When the button D1 in the message screen W3 is pressed after the selection by the user, the input unit 1 acquires the information selected by the user and the setting of rearrangement by the sorting unit 7 is changed. These message screens W3 and W4 may be displayed on the control panel 120 including the touch panel display 121 of the image processing apparatus 100 as an MFP, and may be selected by the user.

Figure 11:
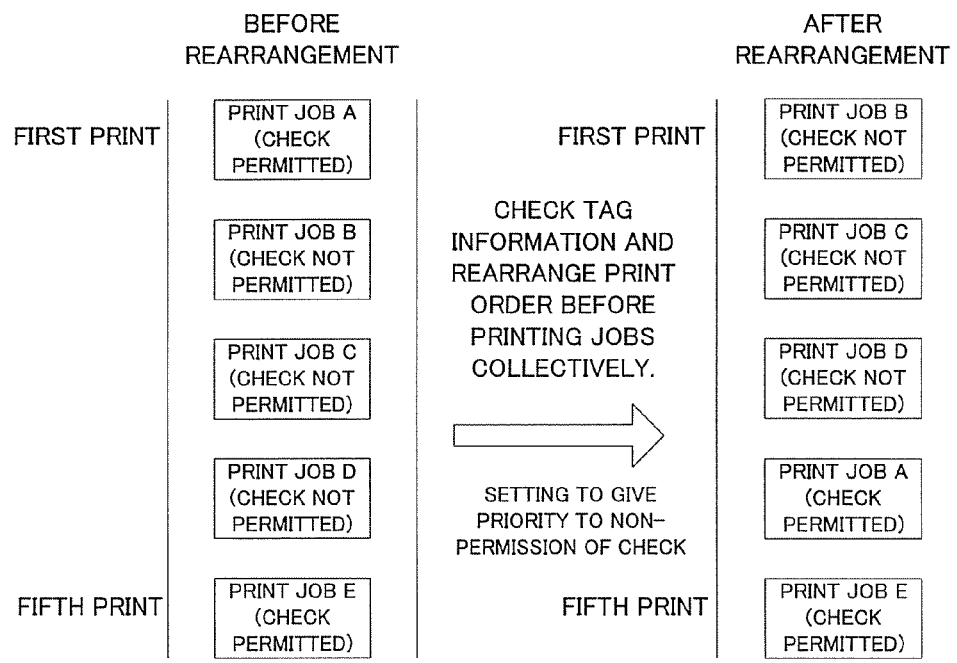
FIG. 11 shows an example of sorting by the sorting unit in the case of giving priority to non-permission of check.

When the setting to rearrange the print order is carried out as in the examples of FIG. 9 and FIG. 10, the sorting unit 7 sorts the print jobs as shown in FIG. 11. In the example of FIG. 11, the print job A is supposed to be executed first. However, since the print job A has the value to permit self-check added thereto, the sorting unit 7 sorts the print jobs so that print jobs with the value not to permit self-check added thereto are preferentially executed. With such rearrangement, these print jobs are preferentially printed if a checkmark is not placed in the self-check permission section C1 in FIG. 4B, and this setting is effective for a user who wants to complete the output of printed matter as quickly as possible.

Figure 12:
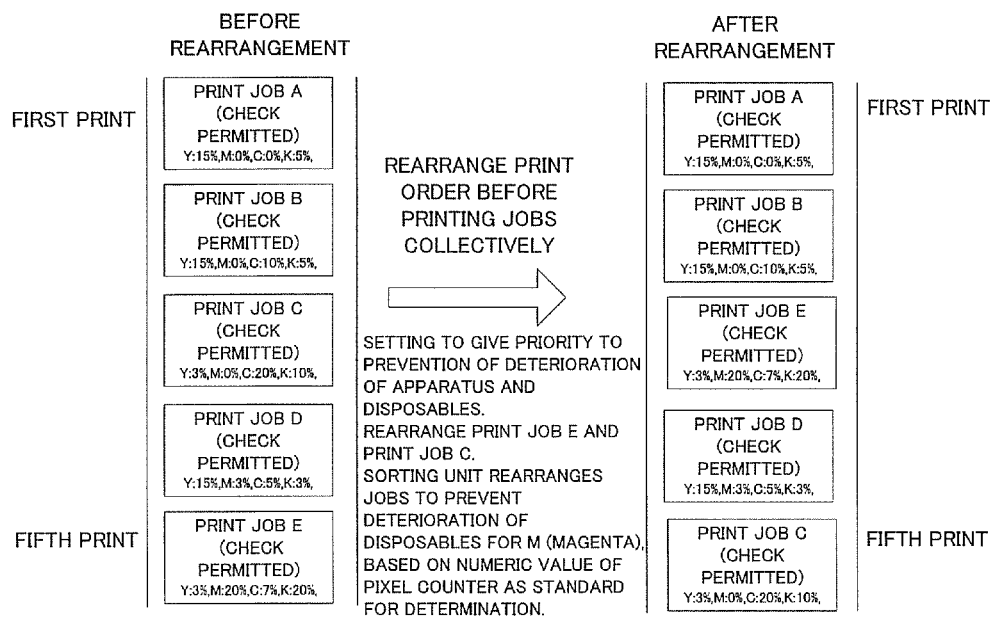
FIG. 12 shows an example of sorting by the sorting unit based on colors used.

Meanwhile, when the user carries out setting so that preferential print is automatically determined, using the message screen W4 of FIG. 10, the sorting unit 7 automatically determines the print order as shown in FIG. 12. The standard for rearrangement is customized according to the properties of the image processing apparatus (optimum setting for stabilization of image quality and prevention of deterioration of the apparatus and disposables can be selected). For example, in the case of an image processing apparatus having such a characteristic that if print is carried out for a long time using a specific color material only, disposables related to color materials that are not used deteriorate increasingly, the sorting unit 7 rearranges print order when it is determined that the deterioration of the disposables can be prevented. In the example of FIG. 12, the rate of use of each color material is calculated for each of accumulated images, in the image analysis (the sorting unit 7 may calculate the rate of use). The sorting unit sorts print jobs so that no color materials are left unused for a long time.

In the above, the system 500 including the image processing apparatus 100 and the PC 200 is described. However, the system is not limited to these embodiments. A system including plural image processing apparatuses and plural PCs may also be used.

As described in detail above, according to the technique described herein, tag information indicating the need for image self-check is added to image data, based on the result of analysis of the image data, and the execution of self-check is controlled based on the tag information. Thus, convenience to the user is improved. Moreover by avoiding the execution of unnecessary self-check, it is possible to reduce power consumption by the image processing apparatus and to prevent deterioration of the apparatus and deterioration of disposables used in the apparatus.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image processing apparatus comprising:
    an information adding unit which determines whether or not to store information to which a predetermined value is added, in a storage unit, based on a result of analysis of image data, and adds the predetermined value to the information and stores the information in the storage unit in association with the image data when the determination is positive;
    a determination unit which determines whether the information with the predetermined value added thereto is in the storage unit or not, after a request for execution of print of the image data is acquired; and
    an execution control unit which controls whether or not check of print quality is to be executed before the execution of print of the image data, based on the result of the determination by the determination unit.

2. The apparatus according to claim 1, wherein the execution control unit performs control so that the check is not carried out when the result of the determination by the determination unit is negative, and performs control so that the check is carried out when the result of the determination by the determination unit is positive.

3. The apparatus according to claim 2, wherein the information adding unit adds the predetermined value to the information and stores the information in the storage unit when it is determined in the result of the analysis that the image data is image data which needs check of density.

4. The apparatus according to claim 2, wherein the information adding unit adds the predetermined value to the information and stores the information in the storage unit when it is determined in the result of the analysis that the image data is a photographic image.

5. The apparatus according to claim 2, wherein the information adding unit adds the predetermined value to the information and stores the information in the storage unit when it is determined in the result of the analysis that the image data is image data which needs check of color shift.

6. The apparatus according to claim 2, wherein the information adding unit adds the predetermined value to the information and stores the information in the storage unit when it is determined in the result of the analysis that the image data is an image in which plural colors are used from among cyan, magenta, yellow, and black.

7. The apparatus according to claim 2, further comprising an input unit which acquires selected information that is information about whether to permit the check or not, selected by a user who gives a print instruction of the image data, wherein the information adding unit further acquires the selected information from the input unit, and adds the predetermined value to the information and stores the information in the storage unit when the selected information is a value to permit the check.

8. The apparatus according to claim 2, wherein the determination unit further determines whether there is a lapse of a predetermined period after the check is executed, and the execution control unit performs control so that the check is carried out when it is determined by the determination unit that there is a lapse of the predetermined period and it is determined that the information with the predetermined value added thereto is in the storage unit.

9. The apparatus according to claim 8, comprising a sorting unit which sorts print order so that image data corresponding to the information with the predetermined value added thereto are collectively printed, when plural image data as print targets are accumulated, wherein the determination unit carries out determination in order of the image data sorted by the sorting unit, and the execution control unit performs control in order of the image data sorted by the sorting unit.

10. The apparatus according to claim 9, wherein the sorting unit further performs sorting so that the image data corresponding to the information with the predetermined value added thereto shift to a higher place in the print order.

11. The apparatus according to claim 9, wherein the sorting unit further performs sorting so that the image data corresponding to the information with the predetermined value added thereto shift to a lower place in the print order.

12. The apparatus according to claim 9, wherein the sorting unit performs sorting only when the plural image data are image data whose print instructions are given by the same user.

13. The apparatus according to claim 9, wherein the sorting unit controls whether to perform sorting or not, based on an instruction from a user.

14. The apparatus according to claim 1, comprising a sorting unit which, when plural image data as print targets are accumulated, sorts print order based on a color used in each of the plural image data, wherein the determination unit carries out determination in order of the image data sorted by the sorting unit, and the execution control unit performs control in order of the image data sorted by the sorting unit.

15. A check control method to be used in an image processing apparatus, comprising:

determining whether or not to store information to which a predetermined value is added, in a storage unit, based on a result of analysis of image data, and adding the predetermined value to the information and stores the information in the storage unit in association with the image data when the determination is positive;

determining whether the information with the predetermined value added thereto is in the storage unit or not, after a request for execution of print of the image data is acquired; and controlling whether or not check of print quality is to be executed before the execution of print of the image data, based on the result of the determination.

16. The method according to claim 15, wherein the image processing apparatus performs control so that the check is not carried out when the result of the determination about whether or not there is the information with the predetermined value added thereto is negative, and performs control so that the check is carried out when the result of the determination about whether or not there is the information with the predetermined value added thereto is positive.

17. The method according to claim 16, wherein the image processing apparatus further determines whether there is a lapse of a predetermined period after the check is executed, and performs control so that the check is carried out when it is determined that there is a lapse of the predetermined period and it is determined that the information with the predetermined value added thereto is in the storage unit.

18. The method according to claim 17, wherein the image processing apparatus further sorts print order so that image data corresponding to the information with the predetermined value added thereto are collectively printed, when plural image data as print targets are accumulated, determines whether the information with the predetermined value added thereto is in the storage unit or not, in order of the sorted image, and controls whether the check of print quality is to be carried out or not, in order of the sorted image data.

19. The method according to claim 18, wherein the image processing apparatus further performs sorting so that the image data corresponding to the information with the predetermined value added thereto shift to a higher place in the print order.

20. The method according to claim 15, wherein the image processing apparatus further sorts, when plural image data as print targets are accumulated, print order based on a color used in each of the plural image data, determines whether the information with the predetermined value added thereto is in the storage unit or not, in order of the sorted image data, and controls whether the check of print quality is to be carried out or not, in order of the sorted image data.

* * * * *